United States Patent
Vashisht et al.

(10) Patent No.: US 11,601,444 B1
(45) Date of Patent: Mar. 7, 2023

(54) AUTOMATED SYSTEM FOR TRIAGE OF CUSTOMER ISSUES

(71) Applicant: FireEye, Inc., Milpitas, CA (US)

(72) Inventors: Sai Vashisht, Morgan Hill, CA (US); Rahul Khul, Pune (IN)

(73) Assignee: FireEye Security Holdings US LLC, Milpitas, CA (US)

( * ) Notice: Subject to any disclaimer, the term of this patent is extended or adjusted under 35 U.S.C. 154(b) by 479 days.

(21) Appl. No.: 16/726,723

(22) Filed: Dec. 24, 2019

Related U.S. Application Data

(60) Provisional application No. 62/787,050, filed on Dec. 31, 2018.

(51) Int. Cl.
*G06F 40/205* (2020.01)
*H04L 9/40* (2022.01)
*G06F 11/36* (2006.01)

(52) U.S. Cl.
CPC ........ *H04L 63/1416* (2013.01); *G06F 40/205* (2020.01); *H04L 63/1441* (2013.01); *G06F 11/3664* (2013.01)

(58) Field of Classification Search
CPC . G06F 40/205; G06F 11/3664; H04L 63/1441
USPC .......................................................... 726/24
See application file for complete search history.

(56) References Cited

U.S. PATENT DOCUMENTS

| | | | |
|---|---|---|---|
| 6,898,632 B2 | 5/2005 | Gordy et al. | |
| 6,941,348 B2 | 9/2005 | Petry et al. | |
| 7,080,407 B1 | 7/2006 | Zhao et al. | |
| 7,080,408 B1 | 7/2006 | Pak et al. | |
| 7,243,371 B1 | 7/2007 | Kasper et al. | |
| 7,308,716 B2 | 12/2007 | Danford et al. | |

(Continued)

FOREIGN PATENT DOCUMENTS

| | | |
|---|---|---|
| GB | 2439806 A | 1/2008 |
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).

(Continued)

*Primary Examiner* — Thanh T Le
(74) *Attorney, Agent, or Firm* — Rutan & Tucker, LLP

(57) ABSTRACT

A device for verifying previous determinations from cybersecurity devices comprising a processor and a storage device communicatively coupled to the processor. The storage device comprises submission analysis logic including object parsing logic to receive submission message data and then parse the submission message data into object data, along with workflow selector logic to receive the object data and process the object data to select at least one analyzer within analyzer logic. The analyzer logic can generate at least one analyzer based on the selected analyzer within the workflow selector logic, analyze the object data for potential threats and embedded object data, generate results data based on that analysis, and pass the embedded object data back to the workflow selector for further analysis. Finally, the submission analysis logic comprises triage ticket generation logic to generate triage tickets for analyst review and alert logic to generate automatic alerts.

21 Claims, 5 Drawing Sheets

(56) References Cited

U.S. PATENT DOCUMENTS

| | | |
|---|---|---|
| 7,448,084 B1 | 11/2008 | Apap et al. |
| 7,458,098 B2 | 11/2008 | Judge et al. |
| 7,467,408 B1 | 12/2008 | O'Toole, Jr. |
| 7,496,961 B2 | 2/2009 | Zimmer et al. |
| 7,519,990 B1 | 4/2009 | Xie |
| 7,540,025 B2 | 5/2009 | Tzadikario |
| 7,639,714 B2 | 12/2009 | Stolfo et al. |
| 7,698,548 B2 | 4/2010 | Shelest et al. |
| 7,779,463 B2 | 8/2010 | Stolfo et al. |
| 7,854,007 B2 | 12/2010 | Sprosts et al. |
| 7,937,387 B2 | 5/2011 | Frazier et al. |
| 7,949,849 B2 | 5/2011 | Lowe et al. |
| 8,006,305 B2 | 8/2011 | Aziz |
| 8,020,206 B2 | 9/2011 | Hubbard et al. |
| 8,045,458 B2 | 10/2011 | Alperovitch et al. |
| 8,069,484 B2 | 11/2011 | McMillan et al. |
| 8,171,553 B2 | 5/2012 | Aziz et al. |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,291,499 B2 | 10/2012 | Aziz et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,438,644 B2 | 5/2013 | Watters et al. |
| 8,464,340 B2 | 6/2013 | Ahn et al. |
| 8,494,974 B2 | 7/2013 | Watters et al. |
| 8,516,593 B2 | 8/2013 | Aziz |
| 8,528,086 B1 | 9/2013 | Aziz |
| 8,539,582 B1 | 9/2013 | Aziz et al. |
| 8,549,638 B2 | 10/2013 | Aziz |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,239 B2 | 11/2013 | Aziz et al. |
| 8,635,696 B1 | 1/2014 | Aziz |
| 8,689,333 B2 | 4/2014 | Aziz |
| 8,713,681 B2 | 4/2014 | Silberman et al. |
| 8,776,229 B1 | 7/2014 | Aziz |
| 8,793,278 B2 | 7/2014 | Frazier et al. |
| 8,793,787 B2 | 7/2014 | Ismael et al. |
| 8,813,050 B2 | 8/2014 | Watters et al. |
| 8,832,829 B2 | 9/2014 | Manni et al. |
| 8,850,571 B2 | 9/2014 | Staniford et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,015,846 B2 | 4/2015 | Watters et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 * | 1/2016 | Bennett ............... H04L 63/1416 |
| 9,251,343 B1 | 2/2016 | Vincent et al. |
| 9,262,635 B2 * | 2/2016 | Paithane ................ G06F 21/53 |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 * | 8/2016 | Cunningham ...... H04L 63/1416 |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,749,343 B2 | 8/2017 | Watters et al. |
| 9,749,344 B1 | 8/2017 | Watters et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 * | 11/2017 | Khalid .................. G06F 21/554 |
| 9,825,976 B1 | 11/2017 | Gomez et al. |
| 9,825,989 B1 * | 11/2017 | Mehra .................. H04L 63/145 |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,892,261 B2 | 2/2018 | Joram et al. |
| 9,904,955 B2 | 2/2018 | Watters et al. |
| 9,910,988 B1 | 3/2018 | Vincent et al. |

(56) References Cited

U.S. PATENT DOCUMENTS

| | | |
|---|---|---|
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,063,583 B2 | 8/2018 | Watters et al. |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 10,282,548 B1 | 5/2019 | Aziz et al. |
| 10,284,574 B1 | 5/2019 | Aziz et al. |
| 10,284,575 B2 | 5/2019 | Paithane et al. |
| 10,296,437 B2 | 5/2019 | Ismael et al. |
| 10,335,738 B1 | 7/2019 | Paithane et al. |
| 10,341,363 B1 | 7/2019 | Vincent et al. |
| 10,341,365 B1 | 7/2019 | Ha |
| 10,366,231 B1 | 7/2019 | Singh et al. |
| 10,380,343 B1 | 8/2019 | Jung et al. |
| 10,395,029 B1 | 8/2019 | Steinberg |
| 10,404,725 B1 | 9/2019 | Rivlin et al. |
| 10,417,031 B2 | 9/2019 | Paithane et al. |
| 10,430,586 B1 | 10/2019 | Paithane et al. |
| 10,432,649 B1 | 10/2019 | Bennett et al. |
| 10,445,502 B1 | 10/2019 | Desphande et al. |
| 10,447,728 B1 | 10/2019 | Steinberg |
| 10,454,950 B1 | 10/2019 | Aziz |
| 10,454,953 B1 | 10/2019 | Amin et al. |
| 10,462,173 B1 | 10/2019 | Aziz et al. |
| 10,467,411 B1 | 11/2019 | Pidathala et al. |
| 10,467,414 B1 * | 11/2019 | Kindlund ............ H04L 63/1425 |
| 10,469,512 B1 | 11/2019 | Ismael |
| 10,474,813 B1 | 11/2019 | Ismael |
| 10,476,906 B1 | 11/2019 | Siddiqui |
| 10,476,909 B1 | 11/2019 | Aziz et al. |
| 10,491,627 B1 | 11/2019 | Su |
| 10,503,904 B1 | 12/2019 | Singh et al. |
| 10,505,956 B1 | 12/2019 | Pidathala et al. |
| 10,511,614 B1 | 12/2019 | Aziz |
| 10,515,214 B1 | 12/2019 | Vincent et al. |
| 10,523,609 B1 | 12/2019 | Subramanian |
| 10,528,726 B1 | 1/2020 | Ismael |
| 10,534,906 B1 | 1/2020 | Paithane et al. |
| 10,552,610 B1 | 2/2020 | Vashisht et al. |
| 10,554,507 B1 | 2/2020 | Siddiqui et al. |
| 10,565,378 B1 | 2/2020 | Vincent et al. |
| 10,567,405 B1 | 2/2020 | Aziz |
| 10,572,665 B2 | 2/2020 | Jung et al. |
| 10,581,874 B1 | 3/2020 | Khalid et al. |
| 10,581,879 B1 | 3/2020 | Paithane et al. |
| 10,581,898 B1 | 3/2020 | Singh |
| 10,587,636 B1 | 3/2020 | Aziz et al. |
| 10,587,647 B1 | 3/2020 | Khalid et al. |
| 10,592,678 B1 | 3/2020 | Ismael et al. |
| 10,601,848 B1 | 3/2020 | Jeyaraman et al. |
| 10,601,863 B1 | 3/2020 | Siddiqui |
| 10,601,865 B1 | 3/2020 | Mesdaq et al. |
| 10,616,266 B1 | 4/2020 | Otvagin |
| 10,621,338 B1 | 4/2020 | Pfoh et al. |
| 10,623,434 B1 | 4/2020 | Aziz et al. |
| 10,637,880 B1 | 4/2020 | Islam et al. |
| 10,642,753 B1 | 5/2020 | Steinberg |
| 10,657,251 B1 | 5/2020 | Malik et al. |
| 10,666,686 B1 | 5/2020 | Singh et al. |
| 10,671,721 B1 | 6/2020 | Otvagin et al. |
| 10,671,726 B1 | 6/2020 | Paithane et al. |
| 10,701,091 B1 | 6/2020 | Cunningham et al. |
| 10,706,149 B1 | 7/2020 | Vincent |
| 10,713,358 B2 | 7/2020 | Sikorski et al. |
| 10,713,362 B1 | 7/2020 | Vincent et al. |
| 10,715,542 B1 | 7/2020 | Wei et al. |
| 10,726,127 B1 | 7/2020 | Steinberg |
| 10,728,263 B1 | 7/2020 | Neumann |
| 10,735,458 B1 | 8/2020 | Haq et al. |
| 10,740,456 B1 | 8/2020 | Ismael et al. |
| 10,747,872 B1 | 8/2020 | Ha et al. |
| 10,757,120 B1 | 8/2020 | Aziz et al. |
| 10,757,134 B1 | 8/2020 | Eyada |
| 10,785,255 B1 | 9/2020 | Otvagin et al. |
| 10,791,138 B1 | 9/2020 | Siddiqui et al. |
| 10,795,991 B1 | 10/2020 | Ross et al. |
| 10,798,112 B2 | 10/2020 | Siddiqui et al. |
| 10,798,121 B1 | 10/2020 | Khalid et al. |
| 10,805,340 B1 | 10/2020 | Goradia |
| 10,805,346 B2 | 10/2020 | Kumar et al. |
| 10,812,513 B1 | 10/2020 | Manni et al. |
| 10,817,606 B1 | 10/2020 | Vincent |
| 10,826,931 B1 | 11/2020 | Quan et al. |
| 10,826,933 B1 | 11/2020 | Ismael et al. |
| 10,834,107 B1 | 11/2020 | Paithane et al. |
| 10,846,117 B1 | 11/2020 | Steinberg |
| 10,848,397 B1 | 11/2020 | Siddiqui et al. |
| 10,848,521 B1 | 11/2020 | Thioux et al. |
| 10,855,700 B1 | 12/2020 | Jeyaraman et al. |
| 10,868,818 B1 | 12/2020 | Rathor et al. |
| 10,868,825 B1 * | 12/2020 | Dominessy ......... H04L 63/1433 |
| 10,872,151 B1 | 12/2020 | Kumar et al. |
| 10,873,597 B1 | 12/2020 | Mehra et al. |
| 10,887,328 B1 | 1/2021 | Paithane et al. |
| 10,893,059 B1 | 1/2021 | Aziz et al. |
| 10,893,068 B1 | 1/2021 | Khalid et al. |
| 10,902,117 B1 | 1/2021 | Singh et al. |
| 10,902,119 B1 | 1/2021 | Vashisht et al. |
| 10,904,286 B1 | 1/2021 | Liu |
| 10,929,266 B1 | 2/2021 | Goradia et al. |
| 11,038,906 B1 * | 6/2021 | Bingham ................ H04L 41/12 |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0169952 A1 | 11/2002 | DiSanto et al. |
| 2002/0184528 A1 | 12/2002 | Shevenell et al. |
| 2002/0188887 A1 | 12/2002 | Largman et al. |

(56) References Cited

U.S. PATENT DOCUMENTS

| | | |
|---|---|---|
| 2003/0084318 A1 | 5/2003 | Schertz |
| 2003/0188190 A1 | 10/2003 | Aaron et al. |
| 2003/0191957 A1 | 10/2003 | Hypponen et al. |
| 2004/0015712 A1 | 1/2004 | Szor |
| 2004/0019832 A1 | 1/2004 | Arnold et al. |
| 2004/0117478 A1 | 6/2004 | Triulzi et al. |
| 2004/0117624 A1 | 6/2004 | Brandt et al. |
| 2004/0236963 A1 | 11/2004 | Danford et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0086523 A1 | 4/2005 | Zimmer et al. |
| 2005/0091513 A1 | 4/2005 | Mitomo et al. |
| 2005/0108562 A1 | 5/2005 | Khazan et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0238005 A1 | 10/2005 | Chen et al. |
| 2005/0262562 A1 | 11/2005 | Gassoway |
| 2005/0283839 A1 | 12/2005 | Cowburn |
| 2006/0010495 A1 | 1/2006 | Cohen et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0031476 A1 | 2/2006 | Mathes et al. |
| 2006/0070130 A1 | 3/2006 | Costea et al. |
| 2006/0117385 A1 | 6/2006 | Mester et al. |
| 2006/0123477 A1 | 6/2006 | Raghavan et al. |
| 2006/0150249 A1 | 7/2006 | Gassen et al. |
| 2006/0161987 A1 | 7/2006 | Levy-Yurista |
| 2006/0173992 A1 | 8/2006 | Weber et al. |
| 2006/0191010 A1 | 8/2006 | Benjamin |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0064689 A1 | 3/2007 | Shin et al. |
| 2007/0143827 A1 | 6/2007 | Nicodemus et al. |
| 2007/0157306 A1 | 7/2007 | Elrod et al. |
| 2007/0192858 A1 | 8/2007 | Lum |
| 2007/0208822 A1 | 9/2007 | Wang et al. |
| 2007/0240218 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2008/0005782 A1 | 1/2008 | Aziz |
| 2008/0040710 A1 | 2/2008 | Chiriac |
| 2008/0072326 A1 | 3/2008 | Danford et al. |
| 2008/0077793 A1 | 3/2008 | Tan et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0189787 A1 | 8/2008 | Arnold et al. |
| 2008/0307524 A1 | 12/2008 | Singh et al. |
| 2008/0320594 A1 | 12/2008 | Jiang |
| 2009/0003317 A1 | 1/2009 | Kasralikar et al. |
| 2009/0064332 A1 | 3/2009 | Porras et al. |
| 2009/0083855 A1 | 3/2009 | Apap et al. |
| 2009/0125976 A1 | 5/2009 | Wassermann et al. |
| 2009/0126015 A1 | 5/2009 | Monastyrsky et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0241190 A1 | 9/2009 | Todd et al. |
| 2009/0300589 A1 | 12/2009 | Watters et al. |
| 2010/0017546 A1 | 1/2010 | Poo et al. |
| 2010/0030996 A1 | 2/2010 | Butler, II |
| 2010/0058474 A1 | 3/2010 | Hicks |
| 2010/0077481 A1 | 3/2010 | Polyakov et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0281542 A1 | 11/2010 | Stolfo et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0099635 A1 | 4/2011 | Silberman et al. |
| 2011/0167493 A1 | 7/2011 | Song et al. |
| 2011/0173213 A1 | 7/2011 | Frazier et al. |
| 2011/0178942 A1 | 7/2011 | Watters et al. |
| 2011/0219450 A1 | 9/2011 | McDougal et al. |
| 2011/0225624 A1 | 9/2011 | Sawhney et al. |
| 2011/0247072 A1 | 10/2011 | Staniford et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0210423 A1 | 8/2012 | Friedrichs et al. |
| 2012/0222121 A1 | 8/2012 | Staniford et al. |
| 2012/0233698 A1 | 9/2012 | Watters et al. |
| 2012/0278886 A1 | 11/2012 | Luna |
| 2012/0331553 A1 | 12/2012 | Aziz et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0185795 A1 | 7/2013 | Winn et al. |
| 2013/0227691 A1 | 8/2013 | Aziz et al. |
| 2013/0232577 A1 | 9/2013 | Watters et al. |
| 2013/0247186 A1 | 9/2013 | LeMasters |
| 2013/0282426 A1 | 10/2013 | Watters et al. |
| 2013/0291109 A1 | 10/2013 | Staniford et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0201836 A1* | 7/2014 | Amsler .................. H04L 63/20 726/23 |
| 2014/0237600 A1 | 8/2014 | Silberman et al. |
| 2014/0259170 A1* | 9/2014 | Amsler ............... H04L 63/1408 726/23 |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0297494 A1 | 10/2014 | Watters et al. |
| 2014/0337836 A1 | 11/2014 | Ismael |
| 2014/0344926 A1 | 11/2014 | Cunningham et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |

(56) References Cited

U.S. PATENT DOCUMENTS

| | | | |
|---|---|---|---|
| 2016/0241580 | A1 | 8/2016 | Watters et al. |
| 2016/0241581 | A1 | 8/2016 | Watters et al. |
| 2016/0261612 | A1 | 9/2016 | Mesdaq et al. |
| 2016/0285914 | A1 | 9/2016 | Singh et al. |
| 2016/0301703 | A1 | 10/2016 | Aziz |
| 2016/0323295 | A1 | 11/2016 | Joram et al. |
| 2016/0330219 | A1* | 11/2016 | Hasan ............... H04L 63/1408 |
| 2016/0335110 | A1 | 11/2016 | Paithane et al. |
| 2017/0083703 | A1 | 3/2017 | Abbasi et al. |
| 2017/0331847 | A1* | 11/2017 | Alexander .......... H04L 63/1433 |
| 2018/0013770 | A1 | 1/2018 | Ismael |
| 2018/0048660 | A1 | 2/2018 | Paithane et al. |
| 2018/0069891 | A1 | 3/2018 | Watters et al. |
| 2018/0121316 | A1 | 5/2018 | Ismael et al. |
| 2018/0124098 | A1* | 5/2018 | Carver .................. G06N 20/00 |
| 2018/0288077 | A1 | 10/2018 | Siddiqui et al. |
| 2019/0104154 | A1 | 4/2019 | Kumar et al. |
| 2019/0132334 | A1 | 5/2019 | Johns et al. |
| 2019/0207966 | A1 | 7/2019 | Vashisht et al. |
| 2019/0207967 | A1 | 7/2019 | Vashisht et al. |
| 2019/0379705 | A1* | 12/2019 | Murphy ................. G06F 30/20 |
| 2020/0252428 | A1 | 8/2020 | Gardezi et al. |
| 2020/0267170 | A1* | 8/2020 | Mohanta ............... G06N 20/00 |
| 2021/0136103 | A1* | 5/2021 | Nishizuka ........... H04L 63/1416 |

FOREIGN PATENT DOCUMENTS

| | | | |
|---|---|---|---|
| WO | 0206928 | A2 | 1/2002 |
| WO | 02/23805 | A2 | 3/2002 |
| WO | 2007117636 | A2 | 10/2007 |
| WO | 2008/041950 | A2 | 4/2008 |
| WO | 2011/084431 | A2 | 7/2011 |
| WO | 2011/112348 | A1 | 9/2011 |
| WO | 2012/075336 | A1 | 6/2012 |
| WO | 2012/145066 | A1 | 10/2012 |
| WO | 2013/067505 | A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al.: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
"Mining Specification of Malicious Behavior"—Jha et al., UCSB, Sep. 2007 httpsT/www.cs.ucsb.edu/.about.chris/research/doc/esec07.sub.-mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.isp?reload=true&arnumbe- r=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag-An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K , (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10 1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).

(56) References Cited

OTHER PUBLICATIONS

Kevin A Roundy et al.: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.

Khaled Salah et al.: "Using Cloud Computing to Implement a Security Overlay Network", SECURITY & Privacy, IEEE, IEEE Service Center, Los Alamitos, CA, US, vol. 11, No. 1, Jan. 1, 2013 (Jan. 1, 2013).

Kim, H., et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King"), (2003).

Kreibich, C., et al., "Honeycomb-Creating Intrusion Detection Signatures Using Honeypots", 2nd Workshop on Hot Topics in Networks (HotNets-11), Boston, USA, (2003).

Kristoff, J., "Botnets, Detection and Mitigation: DNS-Based Techniques", NU Security Day, (2005), 23 pages.

Lastline Labs, The Threat of Evasive Malware, Feb. 25, 2013, Lastline Labs, pp. 1-8.

Li et al., A VMM-Based System Call Interposition Framework for Program Monitoring, Dec. 2010, IEEE 16th International Conference on Parallel and Distributed Systems, pp. 706-711.

Lindorfer, Martina, Clemens Kolbitsch, and Paolo Milani Comparetti. "Detecting environment-sensitive malware." Recent Advances in Intrusion Detection. Springer Berlin Heidelberg, 2011.

Marchette, David J., "Computer Intrusion Detection and Network Monitoring: A Statistical Viewpoint", ("Marchette"), (2001).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in Communication Networks. Springer Berlin Heidelberg, 2010. 20-34.

Mori, Detecting Unknown Computer Viruses, 2004, Springer-Verlag Berlin Heidelberg.

Natvig, Kurt, "SANDBOXII: Internet", Virus Bulletin Conference, ("Natvig"), (Sep. 2002).

NetBIOS Working Group. Protocol Standard fora NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Oberheide et al., CloudAV.sub.-N-Version Antivirus in the Network Cloud, 17th USENIX Security Symposium USENIX Security '08 Jul. 28-Aug. 1, 2008 San Jose, CA.

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Thomas H. Ptacek, and Timothy N. Newsham, "Insertion, Evasion, and Denial of Service: Eluding Network Intrusion Detection", Secure Networks, ("Ptacek"), (Jan. 1998).

* cited by examiner

AUTOMATED SYSTEM FOR TRIAGE OF CUSTOMER ISSUES

CROSS-REFERENCE TO RELATED APPLICATION

This application claims the benefit of U.S. Provisional Application No. 62/787,050, filed Dec. 31, 2018, the entire contents are incorporated herein by reference.

FIELD

Embodiments of the disclosure relate to the field of cybersecurity. More specifically, one embodiment of the disclosure relates to a system, apparatus and method for automatically triaging submitted security-related data.

BACKGROUND

Over the last decade, malicious software (malware) has become a pervasive problem for Internet users. Often, malware is a program or file that is embedded within downloadable content and designed to adversely influence (e.g., attack) normal operations of a computer. Examples of different types of malware may include bots, computer viruses, worms, Trojan horses, spyware, adware, or any other programming that operates within the computer without permission.

For instance, malicious content may be embedded within objects associated with a web page hosted by a web site. By downloading and processing this malware (i.e. malicious content) another web page may be requested from a malicious web site and unknowingly installed on the computer. Similarly, malware may also be installed on a computer upon receipt, or opening, of an electronic mail (email) message. For example, an email message may contain an attachment, such as a Portable Document Format (PDF) document, with embedded executable malware. Also, malware may exist in files infected through any of a variety of attack vectors, which are uploaded from the infected computer onto a networked storage device such as a file share.

Over the past few years, various types of cybersecurity methods have been deployed that have attempted to find malware within files or other network content. Often, these methods evaluate objects suspected of being malicious and subsequently make a determination if the evaluated object is either a threat (i.e. malicious) or not a threat (i.e. benign). In certain circumstances, this evaluation process may yield false negative (a malicious object is deemed to be benign) or false positive (a benign object is deemed to be malicious) results. Such incorrect determinations can lead to users being otherwise exposed to potential threats.

In order to minimize such false positives and negatives, many systems can employ a team of human analysts to further evaluate objects for potential threats. In certain instances, users and/or system administrators of security system products submit an object to a security system vendor to ask for an evaluation or re-evaluation. These submissions may be items that are known to be benign that were deemed to be malicious by the security system during analysis or is perhaps a suspect item that was deemed benign by the security system. In these cases, the submissions are evaluated by the human analysts with a variety of tools to further understand how and/or why the security system came to the conclusion it did.

Such supplemental analysis can be time-consuming and an inefficient use of the human analysts' time as a multitude of analyses can occur simultaneously. In many cases, the human analyst is given the suspicious item without any further background information beyond what the customer provided in the submission process. Often, the lack of data provided by the user in the submission process creates further inefficiencies in the human analysts' time.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
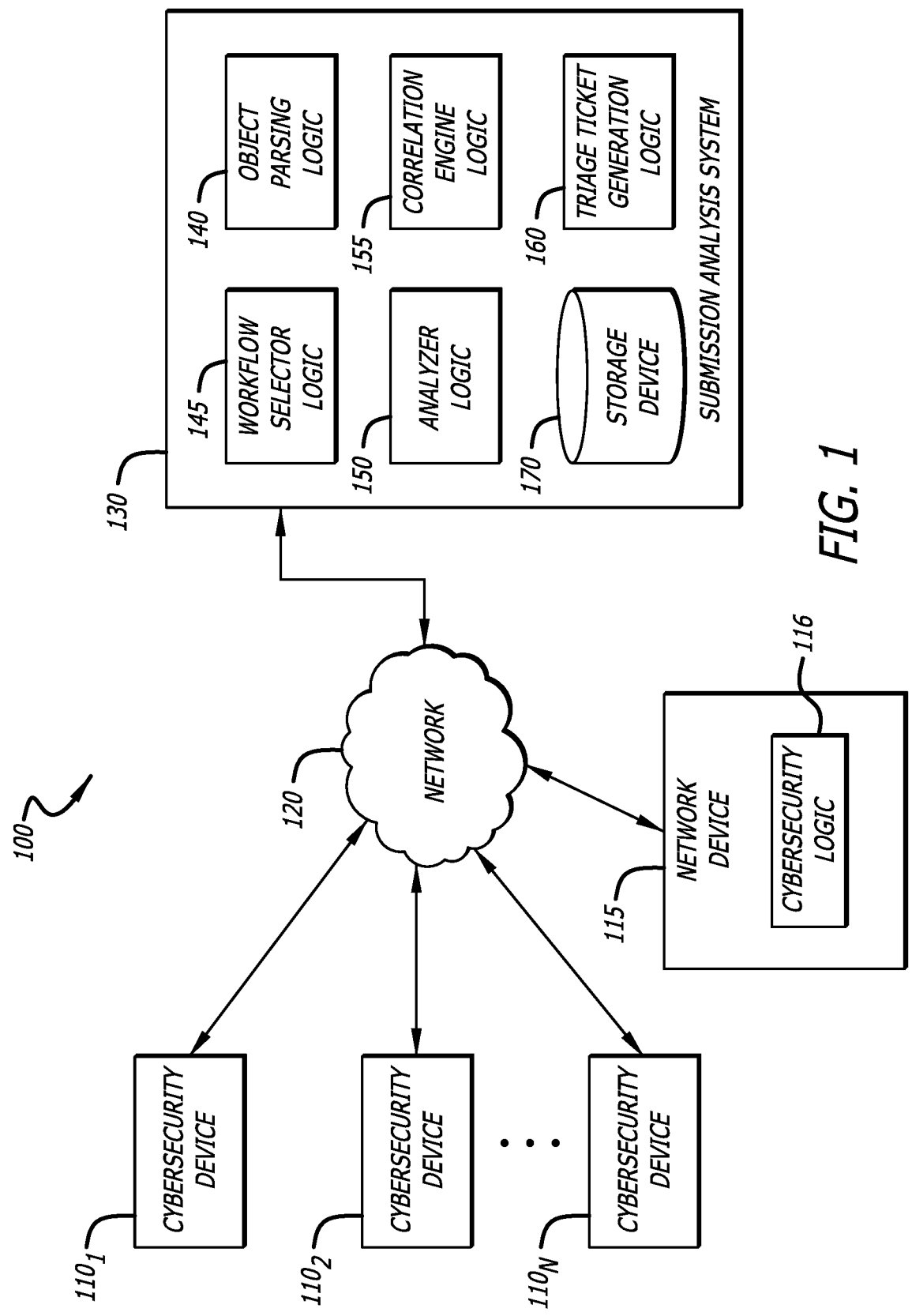
FIG. 1 is an exemplary system diagram of a communication network with a plurality of cybersecurity and network devices in communication with a submission analysis system device.

In light of the problems discussed above, a solution is needed to accelerate the supplemental analysis and classification of objects suspected of being falsely classified. Various embodiments of the disclosure relate to a system and/or process configured to analyze submitted objects and triage the analyzed objects. The triage process can occur by performing analytics on a submitted object, correlating any results, assigning a score and providing that information to an alert logic. The triaged objects can also be utilized to generate triage tickets which may aid human analysts by providing a preliminary set of data to aid in their analysis. Furthermore, the triage system and/or process may comprise a set of pre-determined thresholds or rules that can allow for automatic responses to be generated when presented with certain results without the need for intervention by a human analyst.

More generally, the cybersecurity triage system described herein can receive messages comprising object data and context data associated with classification of the object. The object data and context data are received from a submitter (e.g., a user, customer, etc.) and parsed for re-evaluation of a potential cybersecurity threat. The context data may include meta information about the submitter cybersecurity threat detection system as well as a classification (i.e. verdict) associated with the object. The cybersecurity triage system may reanalyze the received object data in a plurality of analyzers, the analyzers selected by a workflow selector based on at least the object and context data. Results from the selected analyzers are correlated and scored for cybersecurity threats based at least in part on stored, prior classifications. Consequently, triage data is generated. Based on the triage data, a response logic may determine if an alert can automatically be generated to provide (1) the submitter with confirmation of a submitted classification, (i.e. the submitted classification was correct and not a false positive or false negative) (2) the submitter with a correction of submitted classification (i.e. the submitted classification was incorrect and was thus a false positive or false negative), or (3) a cybersecurity analyst with at least the triage data and object data. The cybersecurity triage system thereby, provides an automated triage system based on reevaluation of the received object data to accelerate and improve the efficiency of cybersecurity threat detection support systems.

The cybersecurity triage system can exist within a larger network that may comprise a plurality of network devices having access to a cybersecurity system which may, among other things, analyze incoming objects to determine if a threat is posed to the cybersecurity system or network devices.

Often, the threat classification is based on the security content present in the customer's computing environment. The security content may include, but is not limited or restricted to, analyzer data, scanning rules, heuristics, other digital signatures indicative of threats or any combination thereof. In certain embodiments, the original classification may have been determined by a first cybersecurity system and the reevaluation is subsequently performed by a second and different cybersecurity system or at least by a cybersecurity system with an alternate configuration. In this way, the submission analysis system may attempt to verify the results of prior classifications for customers who are suspicious about the accuracy of such prior threat classifications.

In cases where the classification of a threat is considered to be incorrect by a cybersecurity system user (which may include general users or system administrators), an alert system may allow the cybersecurity system user to generate a submission message that may contain the suspect object (or a hash associated with the suspect object) and send it to a submission analysis system operated by a cybersecurity system vendor (such as, for example, a managed services provider) and/or manufacturer who may then reevaluate the suspicious object to determine if the cybersecurity system generated a false positive or false negative.

The submission message utilized for sending the suspicious object to the submission analysis system for a subsequent classification can be generated on a cybersecurity system configured to create the submission message. The message submission process may be realized through a variety of means including, but not limited to, specialized software agents running on a host computing device, web-based applications hosted on a local cybersecurity system, web-based applications hosted on a remote submission analysis system, and/or hardware interfaces or appliances located within the network. It should also be apparent to those skilled in the art that submission messages may be generated manually or through an automated process (typically in response to at least one pre-determined rule). Additionally, further data relating to the system context can be generated relating to the current operating environment (computer model/operating system/system settings/network settings/etc.) and software related data (file type/associated software/software version/software settings/etc.). Such context data can be packaged with the submission message.

The submission analysis system can receive and parse the incoming submission message data in a manner that allows the system to evaluate and manipulate the suspected object embedded within the submission message data. In many embodiments, this manipulation includes generating and/or instantiating a number of (e.g., one or more) analyzers that can process the object data to evaluate threats and/or determine the methods by which a threat determination was made on the system which submitted the data. The various system and software settings available within the context data can be utilized during evaluation to aid the analyzer logic which may then select and generate analyzers that can mimic the context data settings from the system submitting the message in order to analyze the submitted object similarly to how it may have been processed within the submitting system.

Typically, analyzers are generated by the system to perform analytics on a suspicious object, which may comprise inspecting, identifying and analysis. Such analysis may further comprise examining behaviors of the object that may occur through processing the suspicious object within a virtualized environment and/or through an emulation process, comparing the hash of the suspicious object with hashes of other known malicious and/or benign objects, examining the content of the object to explore its code and structure, as well as looking at any context or metadata that may provide further insight into the suspicious object.

Furthermore, certain embodiments may generate additional analyzers to evaluate the same object data under different computing and/or software environments to determine if similar findings would have occurred. By way of example and not limitation, an object that underwent analytics operating within a first version of a software package may yield a different threat determination than the same object analyzed operating within a second version of the same software. In this way, the submission analysis system may compare threat analyses of objects under a number of different system and software settings. This evaluation under different environments and settings may yield significant insights into the causes of false positive and/or false negative determinations, which can be utilized to generate triage data usable by a human analyst in further evaluations or by the submission analysis system to undertake an automatic remedial action without the need for intervention by a human analyst.

One practical feature of the invention is to automatically generate triage data that can be utilized by human analysts. In this way, the use of the submission analysis system can save the time needed by the human analyst when evaluating the submitted object. Another practical feature is to allow the cybersecurity triage system to process the triage data and automatically generate reports or undertake remedial action based on at least one pre-determined rule without the need for human analysts By having triaging data generated automatically prior to intervention by a human analyst, potential solutions can be provided to the submitting user with a shortened turnaround time, avoiding further potential threats that were deemed benign and allowing the human analyst to focus on other analyses that cannot otherwise be automatically determined by the system.

I. Terminology

In the following description, certain terminology is used to describe features of the invention. For example, in certain situations, the terms "logic" and "engine" are representative of hardware, firmware or software that is configured to perform one or more functions. As hardware, logic may include circuitry such as processing circuitry (e.g., a microprocessor, one or more processor cores, a programmable gate array, a microcontroller, an application specific integrated circuit, etc.), wireless receiver, transmitter and/or transceiver circuitry, semiconductor memory, combinatorial logic, or other types of electronic components.

As software, logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but is not limited or restricted to a programmable circuit; semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "network content" generally refers to information transmitted over a network as one or more messages, namely a grouping of information that comprises a header and a payload, such as any of the following: a packet; a frame; a stream being a sequence of packets or frames; or any other series of bits having a prescribed format. The "payload" is generally defined as including the data associated with the message such as text, software, an image, an object, audio, video, a Uniform Resource Locator (URL), or other types of digital data. The "header" is generally defined as including control information. However, the specific types of control information depend on the network content type.

Other examples of network content include web traffic Hypertext Transfer Protocol (HTTP), email, which may be transmitted using an email protocol such as Simple Mail Transfer Protocol (SMTP), Post Office Protocol version 3 (POP3), or Internet Message Access Protocol (IMAP4). A further example of network content includes an Instant Message, which may be transmitted using Session Initiation Protocol (SIP) or Extensible Messaging and Presence Protocol (XMPP) for example. Yet another example of network content includes one or more files that are transferred using a data transfer protocol such as File Transfer Protocol (FTP) for subsequent storage on a file share. Where the network content is email, Instant Message or a file, the header may include the sender/recipient address, the sender/recipient phone number, or a targeted network location of the file, respectively.

The term "malware" is directed to software that produces an undesirable behavior upon execution, where the behavior is deemed to be "undesirable" based on customer-specific rules, manufacturer-based rules, or any other type of rules formulated by public opinion or a particular governmental or commercial entity. This undesired behavior may include a communication-based anomaly or an execution-based anomaly that (1) alters the functionality of an electronic device executing that application software in a malicious manner; (2) alters the functionality of an electronic device executing that application software without any malicious intent; and/or (3) provides an unwanted functionality which is generally acceptable in other context.

The term "object" generally refers to content in the form of an item of information having a logical structure or organization that enables it to be classified for purposes of analysis for malware. One example of the object may include an email message or a portion of the email message. Another example of the object may include a storage file or a document such as a Portable Document Format (PDF) document, a word processing document such as Word® document, or other information that may be subjected to cybersecurity analysis. The object may also include an executable such as an application, program, code segment, a script, dynamic link library "dll," URL link, or any other element having a format that can be directly executed or interpreted by logic within the electronic device. Network content may be an example of an object and used for malware detection.

Logic (or component or module) may be software that includes code being one or more instructions, commands or other data structures that, when processed (e.g., executed) to perform a particular operation or a series of operations. Examples of software include an application, a process, an instance, Application Programming Interface (API), subroutine, plug-in, function, applet, servlet, routine, source code, object code, shared library/dynamic link library (dll), or a collection of HTML elements. This software may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or engine/component) may be stored in persistent storage.

The term "transmission medium" is a communication path between two or more systems (e.g. any electronic devices with data processing functionality such as, for example, a security appliance, server, mainframe, computer, netbook, tablet, smart phone, router, switch, bridge or router). The communication path may include wired and/or wireless segments. Examples of wired and/or wireless segments include electrical wiring, optical fiber, cable, bus trace, or a wireless channel using infrared, radio frequency (RF), or any other wired/wireless signaling mechanism.

The term "network device" should be generally construed as electronics with data processing capability and/or a capability of connecting to any type of network, such as a public network (e.g., Internet), a private network (e.g., a wireless data telecommunication network, a local area network "LAN", etc.), or a combination of networks. Examples of a network device may include, but are not limited or restricted to, the following: a server, a mainframe, a cyber-security device, a firewall, a router; an info-entertainment device, industrial controllers, vehicles, or an endpoint device (e.g., a laptop, a smartphone, a tablet, a desktop computer, a netbook, gaming console, a medical device, or any general-purpose or special-purpose, user-controlled electronic device). In many embodiments, network devices may contain cybersecurity logic that can generate submission messages.

The term "message" generally refers to signaling (wired or wireless) as either information placed in a prescribed format and transmitted in accordance with a suitable delivery protocol or information made accessible through a logical data structure such as an API. Examples of the delivery protocol include but are not limited or restricted to HTTP (Hypertext Transfer Protocol); HTTPS (HTTP Secure); Simple Mail Transfer Protocol (SMTP); File Transfer Protocol (FTP); iMessage; Instant Message Access Protocol (IMAP); or the like. Hence, each message may be in the form of one or more packets, frame, or any other series of bits having the prescribed, structured format.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Referring to FIG. 1, an exemplary system diagram of a communication network 100 with a plurality of cybersecurity and network devices $110_1$, $110_2$, $110_N$, 115 in communication with a submission analysis system device 130 is shown. The network 100 may include a first cybersecurity device $110_1$ connected to the network 120 that may act as a stand-alone device or may also be commutatively coupled with a second cybersecurity device $110_2$. It is contemplated and implied in FIG. 1 that any number of cybersecurity and network devices $110_1$-$110_N$, 115 may be commutatively coupled to the network 120 and thus to the submission analysis system 130. In many embodiments, the cybersecurity and network devices $110_1$-$110_N$, 115 can comprise cybersecurity logic 116 that can evaluate suspicious objects and create determinations on their potential threat levels.

Cybersecurity and network devices $110_1$-$110_N$, 115 may communicate over private and/or public transmission mediums through the network 120 including the Internet, direct connections between the devices and/or via a wireless network access points. The cybersecurity devices $110_1$-$110_N$ and/or network devices 115 may be various computing devices such as, but not limited to, desktop computing systems, enterprise computing systems, electronic portable computers, or portable cellular phones.

Each submission analysis system device 130 can be adapted in many embodiments to receive submission messages and process the embedded code samples taken from network content for potential malicious code in real-time or at least near real-time. In certain embodiments, the submission messages can be provided in an offline process such as, but not limited to, a user presenting the data to be processed in the form of a drive coupled to the submission analysis system 130.

According to the embodiment depicted in FIG. 1, each cybersecurity device $110_1$-$110_N$ and network device 115 may contain and/or be in communication with a security appliance or agent that is configured to inspect ingress data traffic, identify whether any objects of the data traffic may include malware, and if so, analyze at least those objects. In certain embodiments, this analysis may be conducted in a virtual machine, but may be conducted without the aid of a virtual machine execution environment to detect anomalous behaviors that would be present if the data traffic was actually processed by an electronic device. As a result of the inspections done by the security appliances, objects will be determined to either be malicious or benign.

There are numerous methods in which a security appliance may classify objects as being malicious or benign. In some instances, determinations may depend on various settings within system software. At times, determinations may yield "malicious" or "benign" results. A user operated network device, security administrator, and/or an automated system relying on heuristics or thresholds of confidence in the classification system may suspect the classification is inaccurate (e.g. if the first classification was "malicious" however, the object is suspected of being benign, the object may be considered a "false positive"). This can lead to situations in which an end user is alerted to an object or network traffic being flagged as malicious, even when it is known that the flagged item is in fact benign. Alternatively, a user may still feel unsure of a suspicious item that was determined to be benign. In such situations a submission of these items to an external party such as, but not limited to, the security applicant vendor or manufacturer for reevaluation may be generated. Such submissions can be packaged via a submission message software and sent to a submission analysis system device 130 for evaluation prior to a human analyst looking at the submission.

The submission analysis system 130 can be comprised of a variety of logics and data stores that can be utilized to generate triage data based on received submission messages. In the embodiment depicted in FIG. 1, the submission analysis system 130 is comprised of workflow selector logic 145, object parsing logic 140, analyzer logic 150, correlation engine logic 155, triage ticket generation logic 160 along with a storage device 170, and alert logic 180. As those skilled in the art will recognize, the specific naming, order, and number of logics may vary within the submission analysis system 130 based on the desired application.

It is contemplated that the submission analysis system 130 may be deployed as a device but may also be implemented in a cloud computing service for analysis of the submitted data as described. Furthermore, it is contemplated that the functionality of one or more submission analysis system devices 130 may be incorporated into another management system when malware detection is to be conducted at a centralized resource (e.g. in a load balancing system). By way of example and not limitation, a private organization may incorporate a submission analysis system 130 to re-evaluate threat determinations done on its own systems in order to generate more threat analysis data, keep certain submission objects internal (e.g., where data privacy is an issue), and/or to reduce the time required by human analysts to evaluate the results by avoiding reliance on a third party for the reevaluation.

Figure 2B:
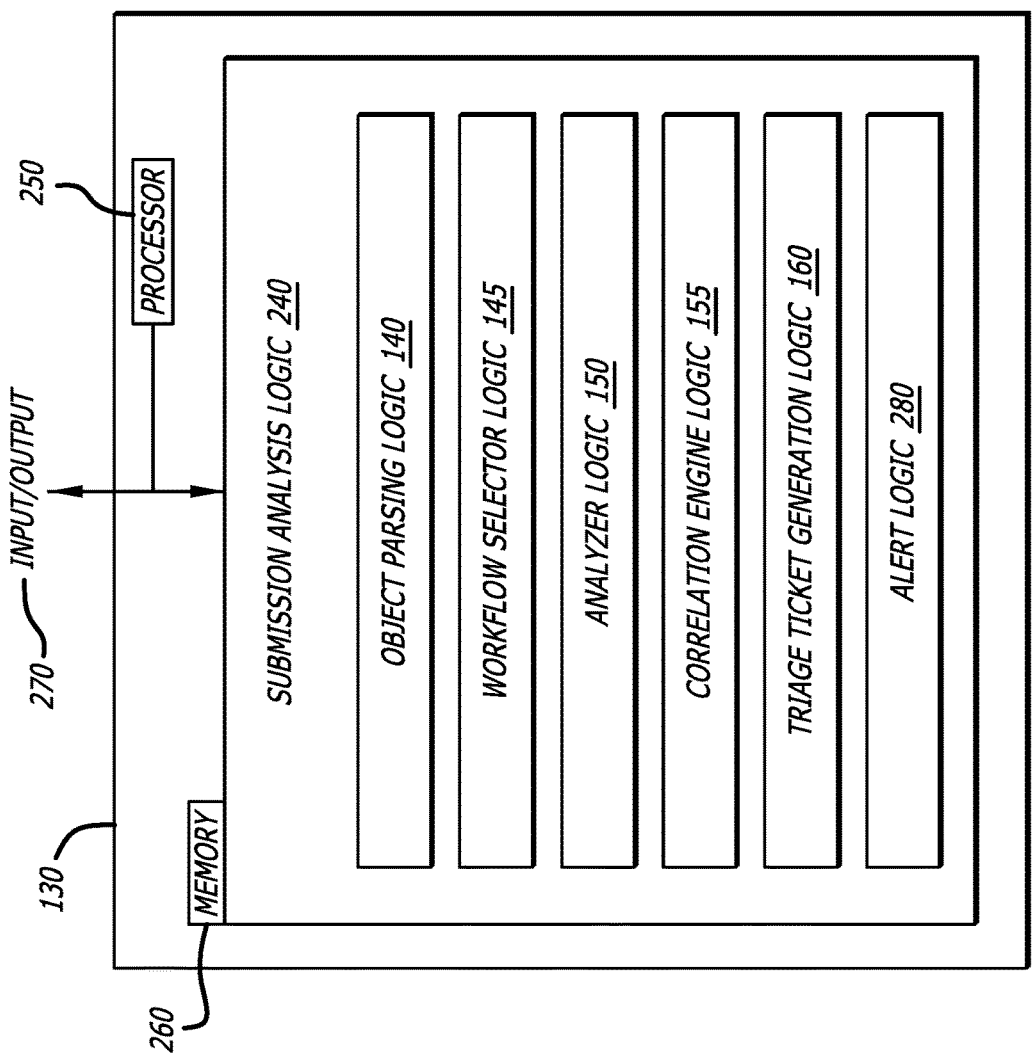
FIG. 2B is an exemplary hardware block diagram of a submission analysis system device.
Figure 2A:
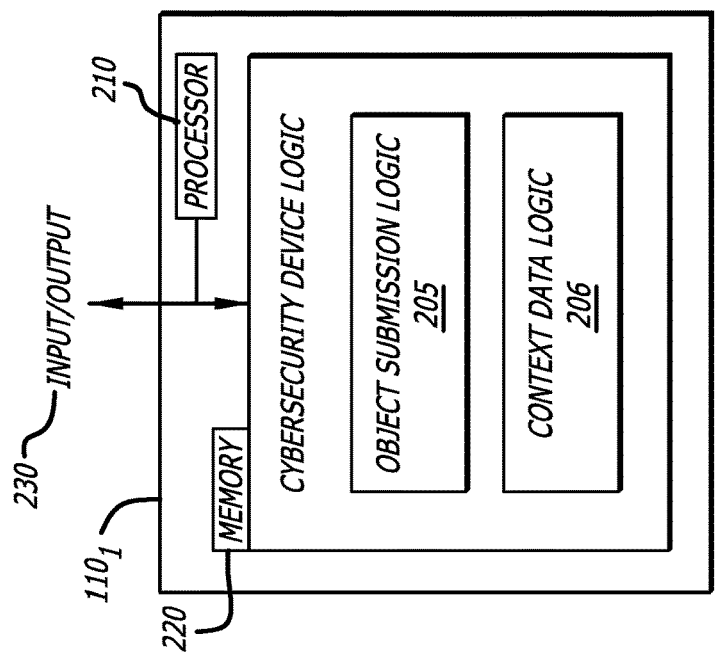
FIG. 2A is an exemplary hardware block diagram of a cybersecurity device.

Referring now to FIG. 2A, an exemplary hardware block diagram of a cybersecurity device $110_1$ is shown. The cybersecurity device $110_1$ and respective hardware can be similar to the network devices $110_2$, $110_N$ as depicted and discussed in FIG. 1. The cybersecurity device $110_1$ comprises one or more processors (e.g., CPU) 210, which is coupled to communication input/output interfaces 230 as well as to a persistent memory system 220. Within the persistent memory system 220 of the embodiment depicted in FIG. 2A, various logics may be provided including object submission logic 205 and context data logic 206. It is also contemplated that certain embodiments of the cybersecurity logic 116 operating within a network device 115 may also perform functions similar to those described with reference to the network device $110_1$ illustrated in FIG. 2A.

In additional embodiments, the object submission logic 205 can be utilized by the user to package, generate, and send a submission message containing objects for reevaluation by a submission analysis system. This process may be effected through the use of a user interface that prompts the user for information related to the object and reasons for submission. In certain embodiments, the object submission logic 205 may automatically generate the submission with data based on the initial evaluation by the cybersecurity system. In these instances, the system may automatically send the submission or could prompt the user to verify the automatically generated data prior to sending the submission. Additionally, the choice between manual and automatic submission message generation and sending may be determined through the use of a pre-determined rule which may include, but is not limited to, the type of threat, the number of evaluations done over a given period of time, time of day generation occurs, and/or the security level of the given user.

Context data logic 206 can be utilized to further add supplemental data to the submission message related to the state of the submitting computing system. In various embodiments, the added context data may aid in the determination of why certain evaluations occurred within the cybersecurity system. Context data may include a variety of computing environment data including, but not limited to, operating system data, operating system settings, network settings, network security settings, local evaluation data, software data, software settings, and/or software version. It would be obvious to those skilled in the art that context data may include other forms of data not specifically outlined above as long as said data may aid in the reevaluation of the object. In some embodiments, context data may include data derived from an external source including, but not limited to, a global data store system similar to those described in U.S. patent application Ser. No. 16/222,194 filed Dec. 17, 2018 and entitled "Platform and Method for Enhanced Cyber-Attack Detection and Response Employing a Global Data Store" the disclosure of which is hereby incorporated by reference in its entirety.

Referring now to FIG. 2B, an exemplary hardware block diagram of submission analysis system device 130 is shown. The submission analysis system device 130 comprises one or more processors (e.g., CPU) 250, which are coupled to communication input/output interfaces 270 as well as to a persistent memory system 260. Within the persistent memory system 260 of the embodiment depicted in FIG. 2, various logics may be provided including submission analysis logic 240. The submission analysis logic 240 further comprises object parsing logic 140, workflow selector logic 145, analyzer logic 150, correlation engine logic 155, triage ticket generation logic 160, and alert logic 180.

The input/output interface 270 can enable communications with other components including other cybersecurity and network devices 110$_1$-110$_N$, 115 as depicted in of FIG. 1 as well as other electronic devices over private and/or public networks. According to one embodiment of the disclosure, the input/output (I/O) interface 270 may be implemented as a physical interface including one or more ports for wired connectors. Alternatively, the entire submission analysis system device 130 can be implemented as software and the input/output interface is implemented as a digital communication logic between the submission analysis system device 130 and other software interfaces. Additionally, or in the alternative, the I/O interface 270 may be implemented with one or more radio units for supporting wireless communications with other electronic devices.

In certain embodiments, the processor 250 can be communicatively coupled to persistent storage 260 over an external transmission medium via the I/O interface 270. According to one embodiment of the disclosure, the persistent storage 260 may load the submission analysis logic 240 within a volatile memory for execution. Of course, in embodiments where the logic is implemented as hardware, submission analysis logic 240, including the sub-components would be implemented separately from persistent memory 260.

The submission analysis logic 240 may be comprised of many sub-components or sub-systems with internal logic suited for particular tasks. In one embodiment illustrated in FIG. 2B, the submission analysis logic 240 comprises separate object parsing logic 140, workflow selector logic 145, analyzer logic 150, correlation engine logic 155, triage ticket generation logic 160, and alert logic 180.

In many embodiments, the object parsing logic 140 can accept submission messages and parse them for processing and evaluation. The parsing process can identify both the object that is to be evaluated and any context and/or other meta information that may aid in the evaluation of the submission message. By way of example and not limitation, the object parsing logic 140 may accept a submission message comprising object data and context data. The object parsing logic 140 may then determine, for example, that the object data comprises a portable document format ("PDF") file as the object to be evaluated as well as context data that was generated by the agent on the cybersecurity device 110 or network device 115 which informs the submission analysis device about the computing environment the PDF was obtained from. It would be known to those skilled in the art that numerous types of objects may be parsed from the submission message.

The software agent utilized for the generation of the submission messages can vary based on the type of device it operates. In a number of embodiments, the submission message agent may operate automatically on an intermediary network device. In other embodiments, the submission message agent may allow for more direct feedback and formatting from a user when located on an endpoint network device. It would be apparent to those skilled in the art that such software agents can be configured to a variety of configurations based upon the application desired and may even be deployed as a single software package that can adapt based on the type of device and/or computing environment it operates within.

Workflow selector logic 145, in a variety of embodiments, can receive and analyze object and context data to select analyzers for evaluation. In certain embodiments, the workflow selector logic 145 may examine the object data for an object data type and select a first sub-set of analyzers for use in the analyzer logic 150. Furthermore, the workflow selector logic 145 may also examine the context data to select a second sub-set of analyzers from within the selection of analyzer logic 150. By way of example and not limitation, the workflow selector logic 145 can analyze received object data and determine that the object is an email type, which yields a first selection of analyzers from within the analyzer logic 150. In many embodiments, the workflow selector logic 145 may implement an ordered analysis of the object. In various embodiments, the analysis may be done in parallel among a plurality of analyzers with their results able to be correlated by the correlation engine logic 155. In response, the workflow selector logic 145 may then analyze the context data and determine what version of email client the cybersecurity device was using or evaluating. In response to this, the workflow selector logic 145 may select a second set of analyzers from within the analyzer logic 150 that correspond to different versions of the email client. Selected analyzers may analyze the object within multiple environments wherein the software versions are different. Through this process, the differences between the processing of the object through different versions may yield data related to why the cybersecurity device came to the threat determination it previously did. In this way, the submission analysis system can utilize the differences within the data generated from the analyzers to generate triaging data which may be utilized to make further determinations regarding the validity of the first determination.

Similarly, it is contemplated that other types of selections may be made based on the contents of the object and/or context data. These other selections may be in response to a variety of factors including, but not limited to, application settings, operating system, operating system settings, file source, and/or file destination. Selection data can be generated by the workflow selector logic 145, which may then be passed to the analyzer logic 150 for implementation. In some embodiments, selection data may comprise data indicating particular analyzers that can be utilized by the analyzer logic 150.

In a number of embodiments, the analyzer logic 150 includes a plurality of different analyzers that may be utilized to evaluate object data. The analyzer logic 150 can receive selection data from the workflow selector logic 145 and launch or utilize the selected analyzers. In some embodiments, the analyzer logic 150 may utilize pre-generated analyzers available in other systems. In certain embodiments, the analyzers may be behavioral analyzers comprising instrumented virtual machines to process the object. The analyzers can be configured according to the context data on which to base the settings of the analyzer. In additional embodiments, the analyzers may emulate the computing environment selected in the selection data and monitor various settings such as, but not limited to, buffer, memory reads/writes, and/or function calls and returns. It is contemplated that the analyzers utilized by the analyzer logic may include a variety of analyzers and may also include other analyzer types based upon the application needed.

The composition or type of analyzers may be updated or otherwise changed periodically or aperiodically to allow for improved analyzers, new analyzers, or removal of ineffective analyzers. The updates may be remotely pushed or can be locally updated through a network connection or a physical connection with an update drive. The output of the analyzers can be passed to the correlation engine logic 155 in the form of results data. Results data may comprise descriptions of any changed states, variables, or behaviors within the analyzed objects.

In a variety of embodiments, correlation engine logic 155 examines and scores the results data from the analyzers into a set of score data. In further embodiments, the score data may be generated by examining the differences between the various analyzers. By way of example and not limitation, the results data can be generated from a variety of analyzers that were instantiated to emulate or simulate a number of different configuration settings within the same email client program used by the cybersecurity device $110_1$ that flagged the email as a threat. Examining the results of the various analyzers may indicate the many analyzers had come to the same conclusion as the cybersecurity device $110_1$; however, it may also indicate that certain analyzers with particular configuration settings changed determined the email was not a threat. In this way, the score data may be formatted and adapted to reflect that various differences in the ultimate processing results in the set of analyzers, which data can be further processed to yield additional insights, such as data indicating accuracy of the various analyzers.

Triage ticket generation logic 160, in certain embodiments, can accept the score data and determine if a triage ticket should be generated. A set of pre-defined thresholds relating to the circumstances warranting a triage ticket to be generated can be pre-loaded into the submission analysis system 130. It would be known to those skilled in the art that the pre-defined threshold may, in additional embodiments, be variable or otherwise updatable through a variety of means including updated rule sets, machine learning, and/or neural networks that can update the weights or rules based on a given input data set. By settings these thresholds and rules, the triage ticket generation logic 160 can evaluate when insightful data was gained from the analyzers and can generate and format a triage ticket reflecting the insightful data which can be reported to a human analyst for further analysis. In this way, the generation of a triage ticket can alert the human analyzer to focus on a specific area of concern based upon the results data generated by the analyzers, thus saving time and effort.

There may be instances where a remedial action may need to be taken before a human analyzer has time to read and analyze a triage ticket. In these embodiments, the submission analysis logic 240 may comprise an alert logic 180 that can take remedial actions without human intervention. In many embodiments, the submission analysis device 130 may be given a set of pre-defined thresholds and/or rules that may empower the submission analysis device 130 to take remedial actions immediately based on the score data derived from the results data. By way of example and not limitation, the correlation engine logic 155 may generate score data that indicates that a simple change in the settings of the computing environment or software suite of the cybersecurity device $110_1$ can yield a satisfactory result for the user. The alert logic 180 can then auto-generate a report, email, or other communication to the user informing them of these findings and providing a suggestion to change the setting that was causing the negative outcome. In other cases, the alert logic 180 may respond to the determination that the score data indicates that a false negative occurred and that it would be advantageous to notify all potentially affected parties as soon as possible in case a human analyst was not immediately available to evaluate. Thus, the alert logic could report out to not only users, but also to outside or third parties that may benefit from this information.

III. Basic Triage Data Generation

Figure 3:
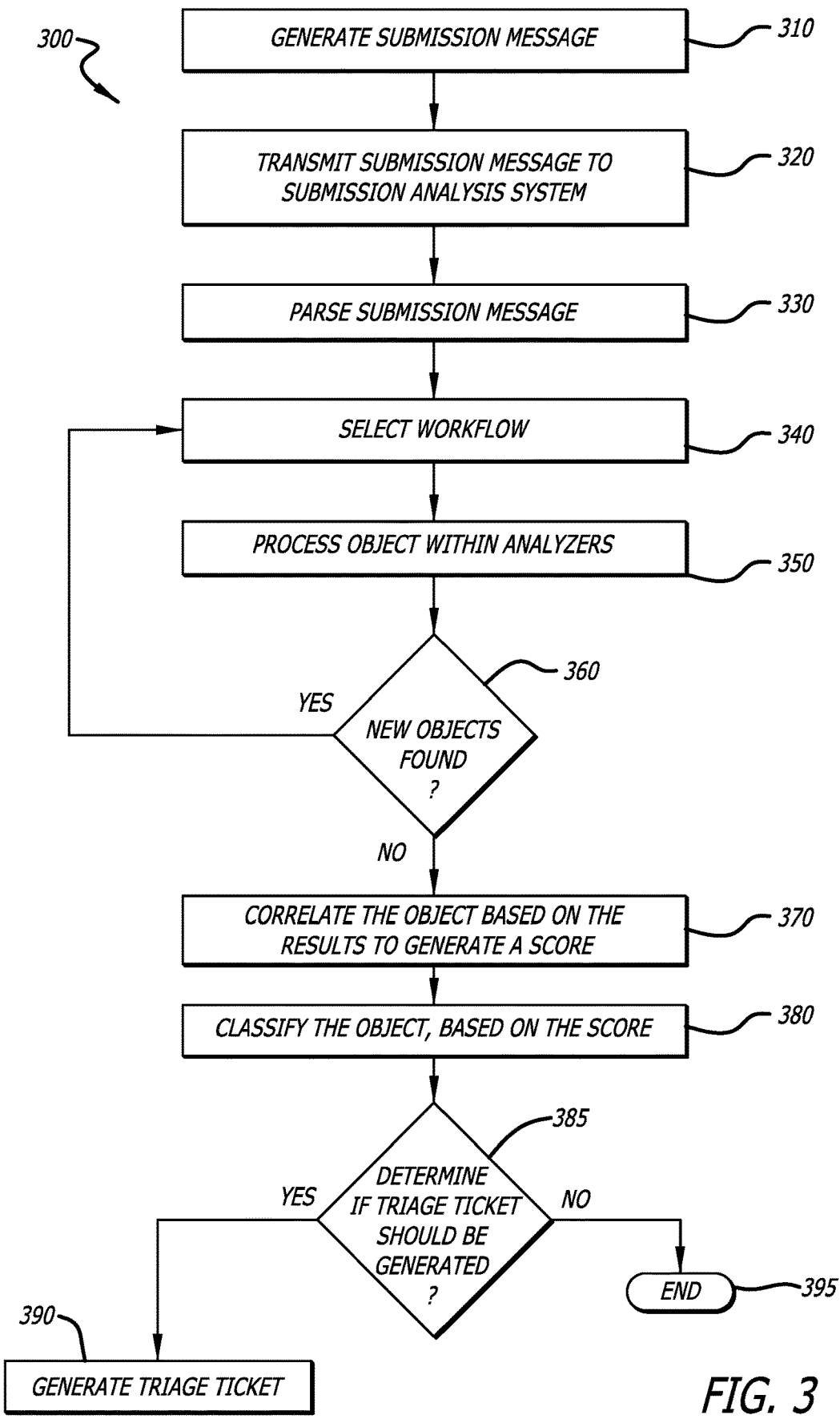
FIG. 3 is an exemplary flowchart of a triage data generating process.

Referring to FIG. 3, an exemplary flowchart of a triage ticket generating process is shown. The process 300 as outlined can be accomplished by a variety of devices and methods, including by the devices outlined in FIGS. 2A-2B. The process 300 typically begins when a user generates a submission message for reevaluation (block 310). Once generated, the submission message can then be transmitted to the submission analysis system for processing (block 320). Upon reception, the submission analysis system can then parse the message to extract the object that is to be reevaluated along with any other relevant data packaged within the submission message (block 330). In many embodiments, the submission message is parsed into the object data and context data that comprises data related to the host computing and/or software environment.

The submission analysis system can take the submitted data, once parsed, and analyze it to select a workflow that may best process the data (block 340). In a number of embodiments, the workflow selection is a selection of particular analyzers within the analyzer logic. In further embodiments, the selection may examine the object to determine the file type or contents of the object data and select an analyzer that has been designed to best analyze that file type or contents. By way of example and not limitation, the selection may be based on the determination that the object data for reevaluation contains a text file, which then selects an analyzer that is best suited to analyze text files.

Once selected, the process 300 may then process the object with the selected analyzers (block 350). In certain embodiments, the analyzers may include a virtual machine that attempts to open, process, or otherwise operate the object by common (or otherwise expected) means. In additional embodiments, the analyzers may analyze the object data in an emulated environment. In further additional embodiments, the analyzers may generate a hash of the object data for further comparison/analysis.

In certain instances, the object data, upon analysis in the analyzer, may generate or locate an embedded object that itself may need to be evaluated. By way of example and not limitation, a text file may contain a link to an external website, which itself should be evaluated as part of the overall threat analysis. As such, the process 300 determines if new objects have been found in process within the analyzed object (block 360). When embedded objects are found, the process 300 can send the newly determined object data to the workflow selector to then again select a workflow based upon the embedded object (block 340). When all objects have been found and no further embedded objects are determined, the process 300 may then correlate the results and generate a score (block 370). Such correlation may include examining the analyzed results with results previously provided in the context data of the submitting machine. The correlation of the results can be quantified as a series of score data. Upon completion of the results correlation, the process 300 may classify the object based on the score which can then be utilized to make a reevaluation (block 380). The classification can be realized through a variety of means including comparison to a set of pre-determined thresholds or rules In many embodiments, the process 300 determines if the triage ticket should be generated based upon the classification of the score data (block 385). In certain cases, the score may be classified in a way that does not warrant the generation of a triage ticket. In more embodiments, score data can be utilized to generate a triage ticket (block 390). The exact type of triage ticket generated can depend on a plurality of pre-determined rules that may interpret and/or classify the score data. In response to the score being classified such that a triage ticket does not need to be generated (and consequently not analyzed by a human analyst), an automatic response may be generated and sent back to the submitting user (block 395). By way of illustrative example, the results may yield a determination that the suspicious object is benign and generated a false positive result due to differences in how the submitter's software version handles the object. In these cases, no direct involvement of the human analyst is needed and an automatic response with remedial actions to take may be generated and sent to the submitter. In this way, the human analyst may increase the amount of time spent on other undetermined threat analyses. The flow of the various logics of the submission analysis system is described in more detail in FIG. 4.

IV. Submission Message Data Flow

Figure 4:
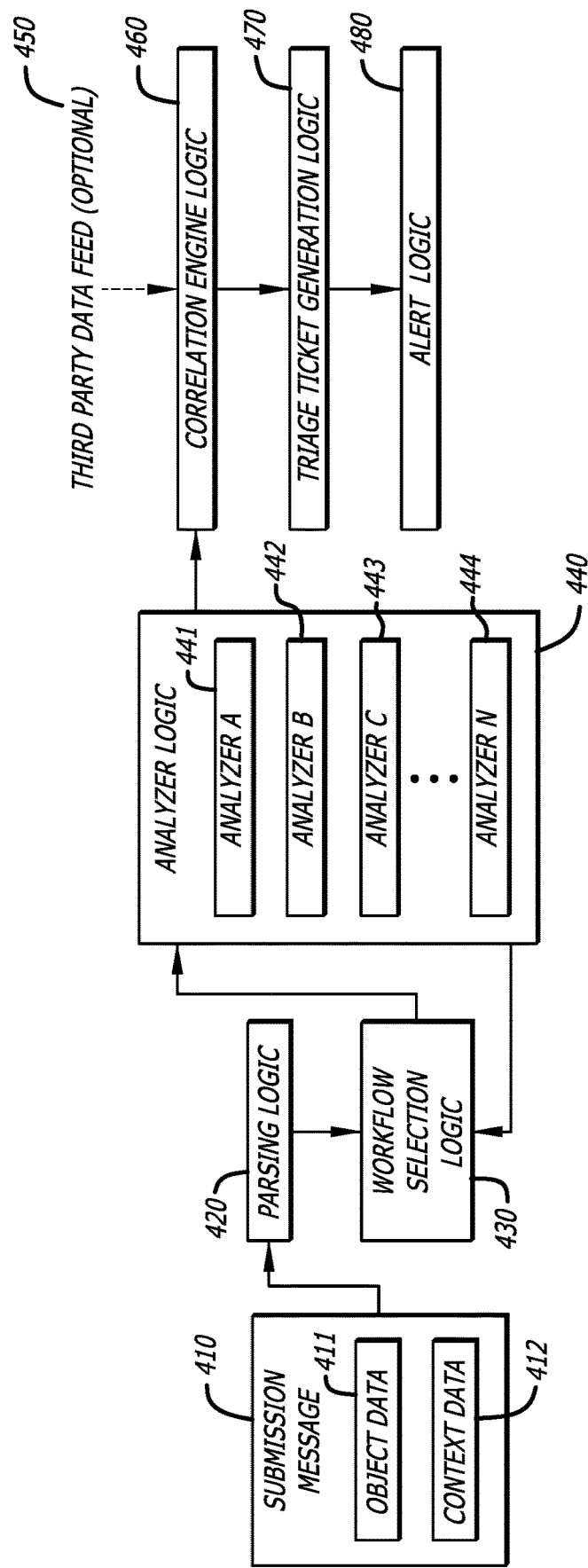
FIG. 4 is an exemplary flowchart illustrating the interoperation between the submission analysis logics.

Referring now to FIG. 4, an exemplary logic flowchart detailing the processes of processing submission message data with submission analysis system logic is shown. In many embodiments, a submission message 410 is generated that comprises both object data 411 representing the object under reevaluation, and context data 412 which can itself comprise data relating to the submitting computing device environment and/or settings.

Upon submission through any of a variety of transmission mediums, the parsing logic 420 can then parse and process the submission message into its constituent object data and context data parts in a format that can be utilized within the submission analysis logic. Parsed data is then sent to workflow selection logic 430 that can then determine the most suitable analyzer for the object data. In certain cases, the object data may have multiple objects that require multiple analyzers of different types.

The object data is passed to the analyzer logic 440 which may then generate any number of selected analyzers A-N 441, 442, 443, 444 based on the type of object data submitted. As discussed above, object data analyzed within an analyzer may have another embedded object that must also have an analyzer selected. In these instances, the embedded object is sent back to the workflow selector logic for further evaluation and analyzer selection. In other instances, object data may be evaluated through several analyzers to determine differences in results.

By way of example and not limitation, object data may be emulated or run within a virtual environment or with a first version of a particular software application, along with a second or alternative version, etc. In some embodiments, the analyzer logic 440 may model a computing system to generate results data based on observed behaviors or instructions associated with the suspicious object. In certain embodiments, the analyzer logic 440 generate virtualized machines that simulate a run-time environment expected by the suspicious object in order to perform in-depth dynamic (behavioral) analysis on the object in efforts to detect one or more anomalous behaviors. The virtual machines may be configured with a software or computing environment profile corresponding to an image that can be configured or selected by workflow selector logic 430. The analyzers evaluate the processing of the object data and generate results data.

The results data can be passed through to correlation engine logic 460 that may then analyze the entire set of data between the plurality of analyzers 441, 442, 443, 444. The differences between the various analyzers 441, 442, 443, 444 may be utilized to generate score data. In many embodiments, score data can additionally be generated by evaluating the parsed context data 412 within the submission message 410. In some embodiments, the correlation engine logic 460 may be configured to receive an external data feed 450, which can be utilized to add further information (e.g. context) during correlation and added as part of the score data. By way of example and not limitation, the external data feed 450 may be comprised of newly discovered threats and/or issues related to updated computing/software environments and settings subsequently identified by any source including a third-party source. Similarly, in some embodiments, classifications associated with previously analyzed objects may be used by the correlation engine logic 460 to add further context to the score data.

Upon generation of score data, it can be utilized by the triage ticket generation logic 470 which can evaluate the score data to determine if a triage ticket should be generated, or some other method of reporting the results to a human analyst. In a number of embodiments, triage data generated may be generated and utilized to create a triage ticket as part of an auto-generated report that is readable by the human analyst. In response to at least one pre-determined rule, triage data may be utilized by alert logic 480 to auto-generate an alert that can be sent out to the human analyst for immediate review, to the user of the submitting device, and/or to third parties.

V. Detailed Triage Ticket Data Generation Process

Figure 5:
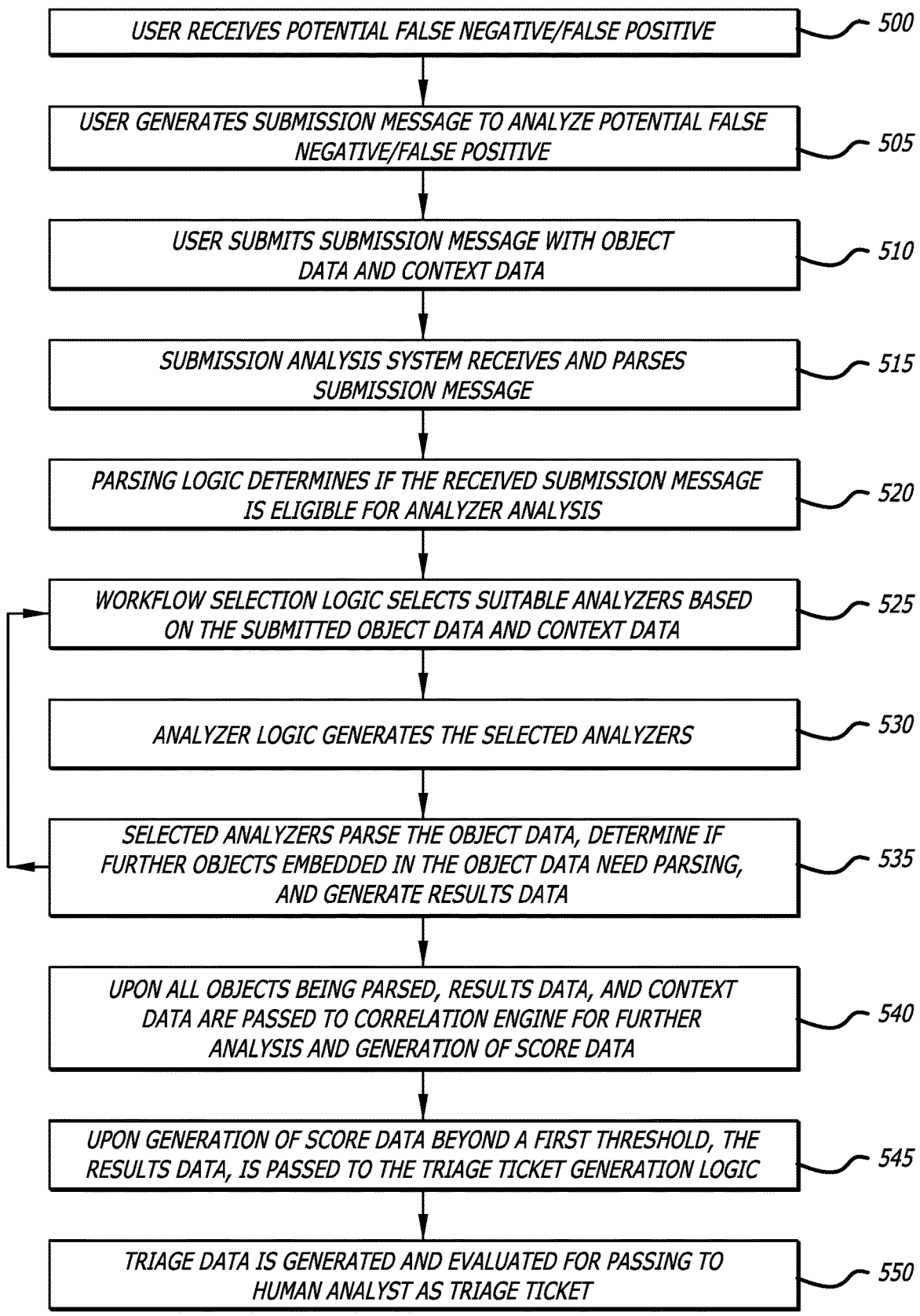
FIG. 5 is an exemplary embodiment of a flowchart illustrating the generation of triage data in response to a potential false negative and/or false positive result.

Referring now to FIG. 5, an exemplary embodiment of a flowchart illustrating the generation of triage data in response to an object re-evaluation such as a potential false negative and/or false positive result is shown. The process can begin when a user receives a notification from their cybersecurity system or network device containing cybersecurity logic that a false negative or false positive result was found (block 500). In response, the user may generate a submission message to analyze the potential false negative and false positive result (block 505). In some embodiments, the user can generate the submission message manually through the use of a software agent specialized to generate submission messages for the submission analysis system. In additional embodiments, the software agent may automatically evaluate the host system and generate the submission message automatically based on a set of pre-determined thresholds and/or rules.

The submission message, prior to sending, can be formatted with object data reflecting the object that is to be reevaluated and context data reflecting the computing environment of the cybersecurity device (block 510). It is contemplated that the submission message format may comprise additional types of data based upon the specific application needed. The submission message, once generated, is transmitted to the submission analysis system where it is parsed for further processing (block 515).

In a number of embodiments, the submission analysis system may make a pre-analysis determination if the submission message is satisfactory, eligible, and/or warrants a full submission analysis (block 520). This step may allow the submission analysis system to reject any messages that are not formatted correctly, or that have already previously been evaluated. It is contemplated that the submission analysis system can have access to a data store comprising data that relates to past message submissions and eventual results. Once the submission analysis system determines that the submission message should be fully processed, the parsed object and context data can be sent to the workflow selector logic.

The workflow selector logic accepts the object and context data and evaluates them to select at least one analyzer from the selection of analyzers available in the analyzer logic (block 525). The selection is typically done based on a combination of object and context data contents. In certain embodiments, the selection may be composed as an intersection of the object and context data contents, whereas other embodiments may determine an additive selection process may yield better potential results.

Once selected, the selection data is sent to the analyzer logic which in response generates (or instantiates) the selected analyzers (block 530). The analyzers can mimic certain computing environments that may be similar but are usually slightly different from the computing environment of the cybersecurity device that generated the submission message. As discussed above, analyzers can emulate various computing environments, operating systems, software applications, along with a variety of operating system/software settings and varying versions. Typically, multiple analyzers are utilized to parse a single object so that differences in the output or operation can be observed.

In certain instances, when parsing the object data, an embedded object is discovered that may link or contain another object that should be evaluated (block 535). In these instances, the process can send the newly discovered object back to the workflow selector logic for analysis to determine further analyzers to process the embedded object. In some embodiments, new context data may be extracted along with the embedded object that may be passed to the workflow selector logic. In the absence of additional context data specific to the embedded object, the parent object's context data may be utilized and sent to the workflow selector logic. This process may repeat either indefinitely, until all objects and embedded objects are analyzed, or when a certain number of iterations/levels are reached. It is contemplated that rules may be set up for this process that can maximize threat analysis while avoiding computing overload by a large number of nested/embedded objects.

The analyzers generate results data that is sent to a correlation engine machine to generate score data (block 540). As shown above in more detail in the discussion of FIG. 2, the correlation engine logic can create score data based on a variety of factors including, but not limited to, analyzing the differences in the operation of the various analyzers. In some embodiments, the score data can be represented as a series of results or outputs of the various analyzers utilized in the analyzer logic. A pre-determined or dynamic threshold may be utilized that facilitates the determination of whether triage data generation should occur (block 545).

In certain embodiments where it is determined that a triage ticket should be generated the triage data can be then generated and passed into the alert logic which creates a triage ticket and reports it to the proper channels such that the newly generated triage ticket can be found and utilized by a human analyst for the purpose of determining the issues involved with the object threat detection in a more efficient manner. In certain embodiments, the triage data can be generated and utilized by the triage ticket generation logic to generate and distribute the triage ticket. In other embodiments, the triage data can be generated in response to every re-evaluation and utilized for other purposes not specific to triage ticket generation such as, but not limited to, analyzer testing, third party interactions, or other threshold evaluations.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. An electronic device for automated triaging of cybersecurity threats, the electronic device comprising:
   a processor; and
   a non-transitory storage medium communicatively coupled to the processor, the non-transitory storage medium comprises submission analysis logic configured to receive and process a submission message from a submitter and triage the submission message data associated with the submission message by utilizing:
   an object parsing logic configured to receive the submission message data and parse the submission message data into object data and context data;
   a workflow selector logic configured to receive object data and process the object data to select at least one analyzer;
   an analyzer logic configured to (i) utilize at least one analyzer based on the selected analyzer within the workflow selector logic, (ii) analyze the object data for maliciousness, and (iii) generate results data;
   a correlation logic configured to receive the results data and generate score data based on the received results data; and
   a triage ticket generation logic configured to receive the score data and generate triage data, wherein, in response to the triage data surpassing a pre-determined threshold, a triage ticket is generated.

2. The electronic device of claim 1, wherein the workflow selector logic is configured to select the at least one analyzer within the analyzer logic in response to both the object data and the context data.

3. The electronic device of claim 1, wherein the workflow selector logic is further configured to receive the object data and the context data.

4. The electronic device of claim 1, wherein the correlation logic further receives results data and the context data and wherein the score data is generated in response to both the results data and the context data.

5. The electronic device of claim 1, wherein the at least one analyzer, generated by the analyzer logic, emulates at least one computing environment with a plurality of computing environment settings.

6. The electronic device of claim 1, wherein the at least one analyzer, generated by the analyzer logic, emulates at least one software program with a specified software version with a plurality of software settings.

7. The electronic device of claim 6, wherein the context data comprises data relating to at least one of: computing environment, software version, software settings, computing environment settings, prior threat analysis methods, and prior threat analysis results.

8. The electronic device of claim 7, wherein the selection of the at least one analyzer by the workflow selector logic comprises selecting an analyzer with different computing environment settings than the computer environment settings in the context data.

9. The electronic device of claim 7, wherein the selection of the at least one analyzer by the workflow selector logic comprises selecting an analyzer with different software settings than the software settings in the context data.

10. The electronic device of claim 1, wherein the submission analysis logic further comprises an alert logic, being processed by the processor, to receive the triage data and, in response to surpassing a pre-determined threshold, automatically generate at least one alert to the submitter.

11. The electronic device of claim 1, wherein the analyzer logic utilizes at least one pre-generated analyzer.

12. The electronic device of claim 1, wherein the analyzer logic further comprises passing embedded object data to the workflow selector for further analysis.

13. A method for automated triaging of cybersecurity threats, the method comprising:

parsing data associated with a received submission message into object data and context data;

generating at least one analyzer based, at least in part, on the parsed object data;

analyzing the object data within at least one analyzer for potential threats;

generating results data based on the analyzed object data;

generating score data based on the results data;

generating triage data based on the score data;

generating a triage report in response to the triage data surpassing a first pre-determined threshold; and generating an alert to a submitter based on the triage data surpassing a second pre-determined threshold.

14. The method of claim 13, wherein the alert is generated automatically in response to the triage data not surpassing the first pre-determined threshold.

15. The method of claim 13, wherein the selecting of at least one analyzer is further based on the parsed context data.

16. The method of claim 13, wherein the generating of the score data is further based on the parsed context data.

17. The method of claim 13, wherein the at least one analyzer emulates at least one computing environment with a plurality of computing environment settings.

18. The method of claim 13, wherein the at least one analyzer emulates at least one software program with a specified software version with a plurality of software settings.

19. The method of claim 18, wherein the context data comprises data relating to at least one of: computing environment, software version, software settings, computing environment settings, prior threat analysis methods, and prior threat analysis results.

20. The method of claim 19, wherein the selecting of the at least one analyzer comprises selecting an analyzer with different software settings than the software settings in the context data.

21. The method of claim 13 further comprising:

analyzing the object data within the at least one analyzer for embedded object data;

selecting an analyzer for the embedded object data; and analyzing the embedded object data.

* * * * *